US012152405B2

(12) United States Patent
Yano

(10) Patent No.: US 12,152,405 B2
(45) Date of Patent: Nov. 26, 2024

(54) ELEVATING-TYPE SHELTER DOOR

(71) Applicant: SHELTER JAPAN Co., Ltd., Shizuoka (JP)

(72) Inventor: Akihiko Yano, Shizuoka (JP)

(73) Assignee: SHELTER JAPAN CO., LTD., Shizuoka (JP)

( * ) Notice: Subject to any disclaimer, the term of this patent is extended or adjusted under 35 U.S.C. 154(b) by 302 days.

(21) Appl. No.: 17/456,651

(22) Filed: Nov. 29, 2021

(65) Prior Publication Data

US 2022/0081926 A1 Mar. 17, 2022

Related U.S. Application Data

(63) Continuation of application No. PCT/JP2020/034250, filed on Sep. 10, 2020.

(30) Foreign Application Priority Data

Oct. 11, 2019 (JP) ................. 2019-187503

(51) Int. Cl.
*E04H 9/14* (2006.01)
*E05F 15/56* (2015.01)
(Continued)

(52) U.S. Cl.
CPC ............... *E04H 9/14* (2013.01); *E05F 15/56* (2015.01); *E05F 15/643* (2015.01); *E06B 5/18* (2013.01)

(58) Field of Classification Search
CPC .. E04H 9/14; E04H 9/145; E04H 9/12; E04H 9/08; E04H 9/04; E05F 15/56;
(Continued)

(56) References Cited

U.S. PATENT DOCUMENTS 9,590 A * 2/1853 Bradford et al. ......... B03B 5/04
209/442
3,528,566 A * 9/1970 Weir .................... B65G 1/1378
187/244
(Continued)

FOREIGN PATENT DOCUMENTS

JP 03-042211 Y2 9/1991
JP 2011-084883 A 4/2011
(Continued)

OTHER PUBLICATIONS

International Search Report from International Application No. PCT/JP2020/034250 mailed Nov. 24, 2020.

*Primary Examiner* — Paola Agudelo
*Assistant Examiner* — Adam G Barlow
(74) *Attorney, Agent, or Firm* — Shih IP Law Group, PLLC

(57) ABSTRACT

An elevating-type shelter door enables operators to easily open and close in a short period of time, is highly watertight, and has an excellent durability. A shelter door opens and closes an opening portion when a door body ascends and descends along a guide rail by means of an elevating device. The opening portion is provided on a ceiling of a shelter body. The shelter body is defines an interior space which serves as an evacuation space in an underground. A main body has a central convex portion which slidably fits to the opening portion along an inclination direction in which both the opening portion and the guide rail inclines. An elevating stand is slidably fixed to move along a rest column. The elevating stand is located above the opening portion when the door body is fully ascended and located in the interior space when the opening portion is closed.

8 Claims, 5 Drawing Sheets

(51) Int. Cl.
*E05F 15/643* (2015.01)
*E06B 5/18* (2006.01)

(58) Field of Classification Search
CPC .......... E05F 15/643; E05F 15/67; E06B 5/18; E04B 1/0007
USPC ........... 152/169.6; 182/10; 187/245; 49/208, 49/226, 360; 52/169.6
See application file for complete search history.

(56) References Cited

U.S. PATENT DOCUMENTS

| | | | | |
|---|---|---|---|---|
| 4,026,388 | A * | 5/1977 | Creissels | B66B 9/06 |
| | | | | 187/245 |
| 4,089,391 | A * | 5/1978 | Schill | B66B 9/06 |
| | | | | 187/373 |
| 4,975,012 | A * | 12/1990 | Motoda | E05G 1/06 |
| | | | | 414/277 |
| 5,325,642 | A * | 7/1994 | Cooley | E04B 1/3211 |
| | | | | 52/249 |
| 7,370,725 | B1 * | 5/2008 | Dornfeld | E06C 7/12 |
| | | | | 182/39 |
| 7,546,902 | B2 * | 6/2009 | Schwertner | B66B 9/193 |
| | | | | 187/241 |
| 2010/0140022 | A1 * | 6/2010 | Ach | F16G 5/06 |
| | | | | 187/254 |
| 2011/0005869 | A1 * | 1/2011 | Hinton | B64G 5/00 |
| | | | | 187/414 |
| 2012/0279809 | A1 * | 11/2012 | Ogava | B66B 1/3492 |
| | | | | 187/394 |
| 2015/0204099 | A1 * | 7/2015 | Strout | E04H 9/145 |
| | | | | 52/741.1 |
| 2022/0195747 | A1 * | 6/2022 | Yano | E04H 9/08 |
| 2023/0399886 | A1 * | 12/2023 | Pellegrini | E05F 15/643 |

FOREIGN PATENT DOCUMENTS

| | | |
|---|---|---|
| JP | 2019-094667 A | 6/2019 |
| WO | 2018070467 A1 | 4/2018 |

* cited by examiner

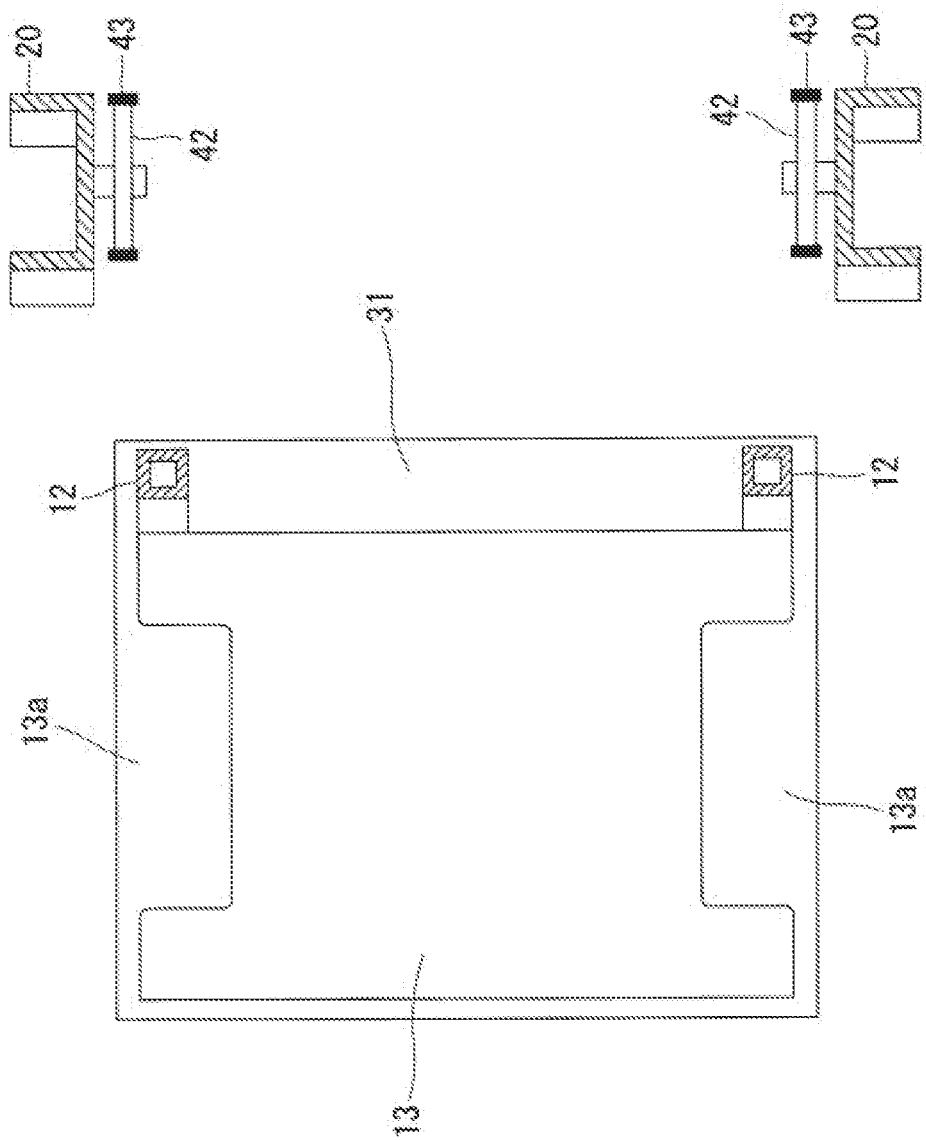

ELEVATING-TYPE SHELTER DOOR

CROSS-REFERENCE TO RELATED APPLICATIONS

This Application is a Continuation application of International Application No. PCT/JP2020/034250 filed on Sep. 10, 2020, which claims the benefit of Japanese Patent Application No. JP2019-187503 filed on Oct. 11, 2019, the entire disclosures of which are incorporated herein by reference.

TECHNICAL FIELD

The present disclosure relates to an elevating-type shelter door in which a door body ascends and descends along a guide rail so as to open and close an opening portion.

BACKGROUND

In the Great East Japan Earthquake, lives of many people were lost due to the huge tsunami. In order to protect the lives of many people against such a huge tsunami, it is one of the effective means as a disaster-preventive policy to quickly evacuate the people to high hills before the tsunami arrives. However, Japan has the major three earthquakes possibly occurring in conjunction with each other, which are represented by Tokai, Tonankai, and Nankai regional earthquakes. In the event of these major three earthquakes, it is anticipated that there will be areas where a tsunami with a height of 30 meter reaches in just 5 minutes after the earthquakes occurs. Evacuating to high grounds in such a short period of time is extremely difficult especially for small children, the elderly and people with disabilities. Even if they could run away to an evacuation building, as a matter of fact, it would be difficult for the evacuees to even climb the stairways.

As an effective countermeasure, it is thought to install a shelter near a residential area in order to evacuate residents to the shelter. This makes it possible to protect the lives of many people against tsunami disasters because the residents can quickly evacuate to the shelter when the earthquake occurs, and they can get out of the shelter after the tsunami has receded.

Upon building a shelter door, the door created for the shelter is required to have abilities to withstand against wave power of the tsunami and endure against a collision of drifting objects. This makes it necessary to form the shelter strong and durable. This unavoidably increases the weight of the shelter.

As a door for the shelter, the so-called "swing door" has been often used. The "swing door" is operatively rotated by means of hinges upon opening and closing an opening portion. In this situation, a large amount of load is applied to the hinges, which makes it difficult to rotate the heavy door smoothly. Further, if an aftershock occurs while the door rotates, a larger amount of load would be applied to the hinges, which gives a damage on the hinges, thereby making it impossible to open or close the door. Even if the damage would not be given to the hinges, it is supposed that the door itself may accidentally rotate at once when the door is subjected to the seismic force, thus rendering the evacuee caught in the door. In addition, when the shelter has been situated at the installation site for a long period of time, it would be anticipated that the long period installation deteriorates the hinges due to aging phenomenon. This renders it more difficult to rotate the door.

The swing door needs to be pivoted at least 90 degrees, preferably 180 degrees. This makes it necessary to move the pivotal end of the door at a longer distance in order to open and close the door. This takes a longer time to open and close the heavy door which is use in particular as the shelter door. Therefore, there would be a risk that delays the evacuation to the shelter to resultantly invite a disaster.

In particular, when it comes to a so-called hatch-type heavy door that is adapted to be rotated upward, it becomes even more difficult to open and close the hatch-type heavy door.

The shelter door may be a "sliding-type" door. It is, however, difficult to ensure an air-tightness between a wall surface of the shelter body and the sliding door because a gap is likely to appear therebetween. By way of illustration, when the shelter is submerged by the tsunami, the inside of the shelter may be flooded.

CITATION LIST

Patent Literature

Patent Literature 1: WO2018/070467
Patent Literature 2: JP2019-94667

SUMMARY OF THE INVENTION

Technical Problem

The object of the present disclosure is to provide an elevating-type shelter door which is capable of being easily opened and closed in a short period of time with a superior water-tightness and an excellent durability ensured.

Solution to Problem

The present disclosure provides an elevating-type shelter door in which a door body is slidably fitted to an opening portion provided at a ceiling of a shelter body. An elevating device is provided to ascend and descend the door body. The elevating device has a guide rail which extends upward along a straight line from the ceiling. The door body opens and closes the opening portion by ascending and descending the door body along the guide rail. The elevating device has an endless belt which is connected to the door body and driven to rotatably move along the guide rail. The door body ascends and descends along the guide rail by moving the endless belt.

According to the structure, the door body is slidably fitted to the opening portion. It is possible to ameliorate a water-tightness performance and enhance a sealing effect of the door body. Since the door body is operated to ascend and descend along the guide rail without a pivotal movement, it is possible to effectively curb the deterioration due to aging phenomenon, as compared to the prior art counterpart which uses the hinges to open and close the swing door. Further, it is possible to easily open and close the opening portion by moving the endless belt with a drive source such as a motor.

Preferably, the door body has an elevating stand provided at a lower end of the door body.

According to the structure, it is possible to use the elevating stand to bring in and out a baggage such as evacuation goods or the like.

Preferably, the elevating stand is located above the ceiling when the door body fully ascends, and the elevating stand is located within an interior space of the shelter body when the door body closes the opening portion.

According to the structure, the elevating stand is located above the ceiling when the door body is fully ascended, and is located within the interior space of the shelter body when the door body closes the opening portion. It is possible to readily load the baggage on the elevating stand and unload the baggage therefrom.

Preferably, the elevating stand is slidably mounted on the door body to move along a direction in which the door body ascends and descends.

According to the structure, the elevating stand is slidably mounted on the door body to move along the direction in which the door body ascends and descends. It is possible to adjust a height of the elevating stand suitable for loading and unloading the baggage.

There is also provided an elevating-type shelter door in which a door body is slidably fitted into an opening portion provided at a ceiling of a shelter body. An elevating device is provided to ascend and descend the door body. The elevating device having a guide rail is provided to extend from the ceiling in a straight line, and the door body ascends and descends along the guide rail so as to open and close the opening portion. The door body has an elevating stand provided at a lower end of the door body. The elevating stand is slidably mounted on the door body to move along a direction in which the door body ascends and descends.

According to the structure, the door body is slidably fitted to the opening portion. It is possible to ameliorate a watertightness performance and enhance a sealing effect of the door body. Since the door body is operated to ascend and descend along the guide rail without a pivotal movement, it is possible to effectively curb the deterioration due to aging phenomenon, as compared to the prior art counterpart which uses the hinges to open and close the swing door. The door body has an elevating stand provided at a lower end of the door body. It is possible to use the elevating stand to bring in and out a baggage such as evacuation goods or the like. Further, the elevating stand is slidably mounted on the door body to move along the direction in which the door body ascends and descends. It is possible to adjust a height of the elevating stand suitable for loading and unloading the baggage.

Preferably, the elevating device has a lift cylinder provided to expand and contract a rod along a direction in which the guide rail extends, and the door body ascends and descends along the guide rail by expanding and contracting the rod of the lift cylinder.

According to the structure, it is possible to easily open and close the opening portion by expanding and contracting the rod of the lift cylinder with a drive means such as a hydraulic pump.

Preferably, the ceiling is adapted to store water.

According to the structure, in the event of a fire, it is possible to curb the temperature rise inside the shelter body due to the latent heat effect of the water stored in the ceiling.

BRIEF DESCRIPTION OF DRAWINGS

FIG. 3 is partial cross-sectional plan views each illustrating a relationship between the opening portion and an elevating stand according to the first embodiment of the disclosure;

DESCRIPTION OF EMBODIMENT

Embodiment 1

With reference to FIGS. 1a through 4b, described below is a first embodiment of the present disclosure.

Figure 1A:
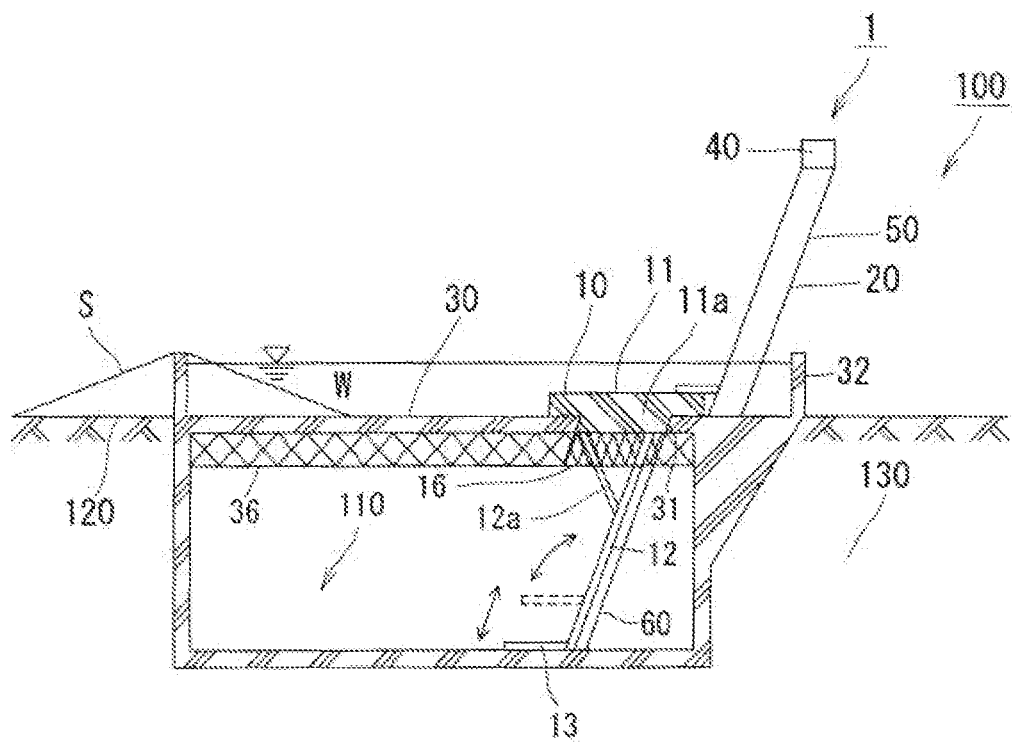
FIG. 1a is a front cross-sectional view of an elevating-type shelter door in a state where an opening portion is closed according to a first embodiment of the disclosure.
Figure 1B:
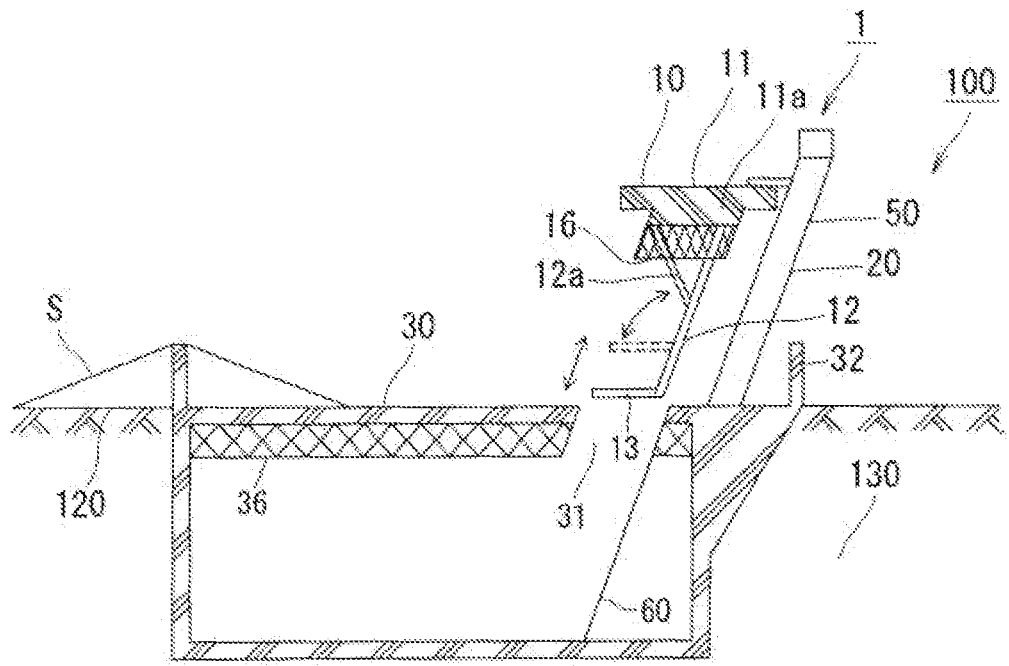
FIG. 1b is a front cross-sectional view of the elevating-type shelter door in a state where the opening portion is opened according to the first embodiment of the disclosure.
Figure 2A:
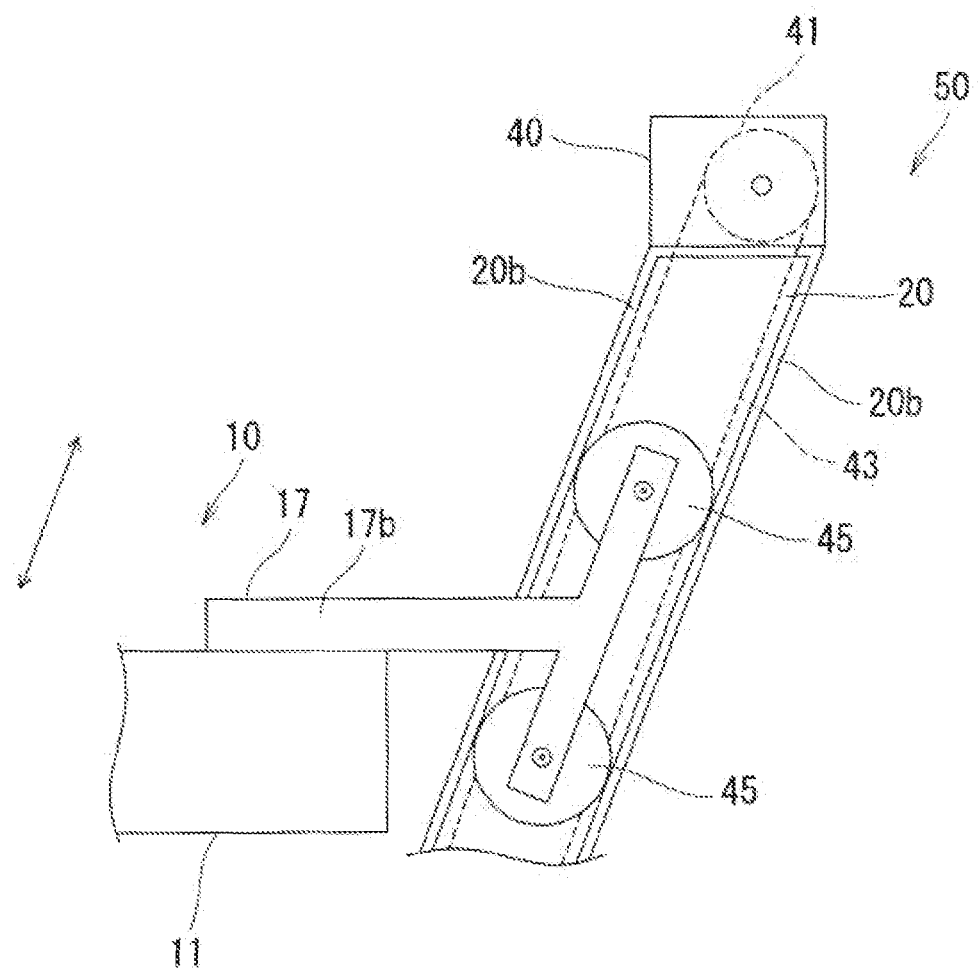
FIG. 2a is a partial front view of the elevating-type shelter door according to the first embodiment of the disclosure.
Figure 2B:
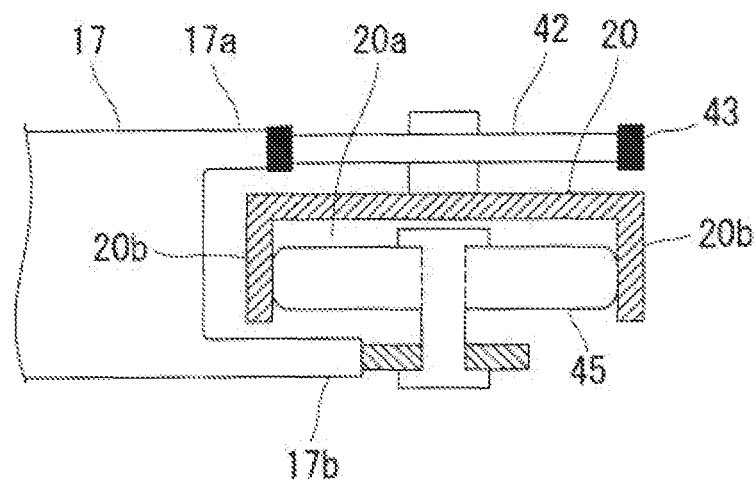
FIG. 2b is a partial cross-sectional plan view the elevating-type shelter door according to the first embodiment of the disclosure.

As shown in FIGS. 1a and 1b, an elevating-type shelter door 1 (hereinafter referred to as "shelter door 1") opens and closes an opening portion 31 when a door body 10 ascends and descends respectively along a guide rail 20 by means of an elevating device 50. The opening portion 31 is provided at a ceiling 30 of a shelter body 100. The shelter body 100 is made of a reinforced concrete material and defines an interior space 110 to serve as an evacuation space in an underground 130.

Around an outer peripheral end of the ceiling 30, provided is an annular ceiling side wall 32 which stands vertically upward from the ceiling 30. Such is the structure that the ceiling 30 forms a basin-shaped recess which opens upward and is capable of storing water W. At a lower side of the ceiling 30, provided is a heat insulating material 36 to be positioned inside the interior space 110. Even if a big fire occurs, the temperature rise of the interior space 110 is curbed due to the latent heat effect of the water W and the heat insulating effect of the heat insulating material 36 when the water W is stored in the recess.

In order to reach and go away from the opening portion 31 by passing over a ceiling side wall 32, provided is a slope way S on the ceiling 30 and an upper surface of a ground 120 to be in contact with both an inner surface and an outer surface of the ceiling side wall 32.

The opening portion 31 provided at the ceiling 30 is inclined at an inclination angle identical to an inclination angle of the guide rail 20 as viewed from its front portion. A ladder 60 is provided within the interior space 110 with which the evacuees can go down and come up through the opening portion 31. The ladder 60 has an installation angle preferably identical to the inclination angle of the guide rail 20. Instead of the ladder 60, landing steps having a tread plate may be provided. In this instance, it is preferable that the tread plate is placed rotatably to align along the inclination angle of the ladder 60.

The door body 10 has a main body 11, a rest column 12 fixedly provided below the main body 11, an elevating stand 13 slidably fixed on the rest column 12 and a connecting portion 17 which is connected to an elevating device 50.

The main body 11 has a central convex portion 11a provided at a central portion of the main body 11. The central convex portion 11a has both outer side surfaces extending downward along the inclined direction of the guide rail 20 as viewed from its front portion. On a lower surface of the central convex portion 11a, provided is a heat insulating material 16. The heat insulating material 16 has both outer side surfaces extending downward along the inclined direction of the guide rail 20 as viewed from its front portion. Such is the structure that the central convex portion 11a is slidably fitted by moving along the inclined direction of the guide rail 20. This fit makes it possible to ascend and descend the door body 10 only along the inclined direction of the guide rail 20, thereby restricting the door body 10 to move in both the horizontal and the vertical directions. The main body 11 is preferably made of a reinforced concrete material. Further, an area of the main body 11 that is provided with the central convex portion 11a preferably has a thickness ranging from 40 cm to 70 cm. A more preferable thickness is 60 cm to 70 cm. The range of the thickness is determined such that the shelter door 1 has a predetermined level of radiation shielding effect, so that the shelter door 1 can also be used as a nuclear shelter door.

Figure 4A:
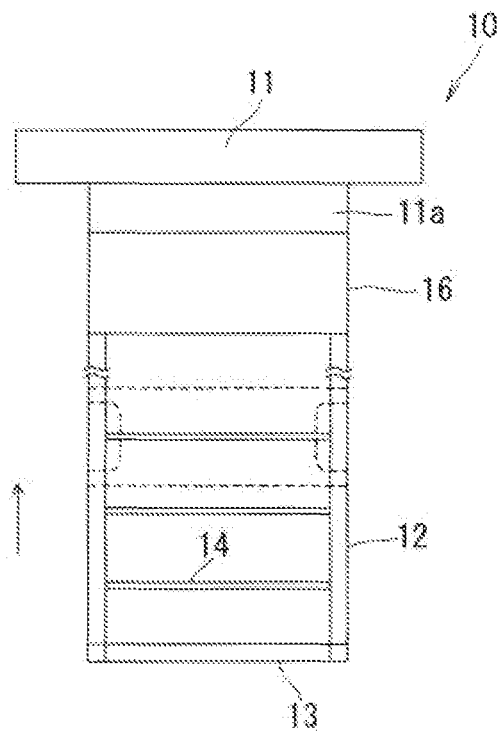
FIG. 4a is a side view of a door body according to the first embodiment of the disclosure.
Figure 4B:
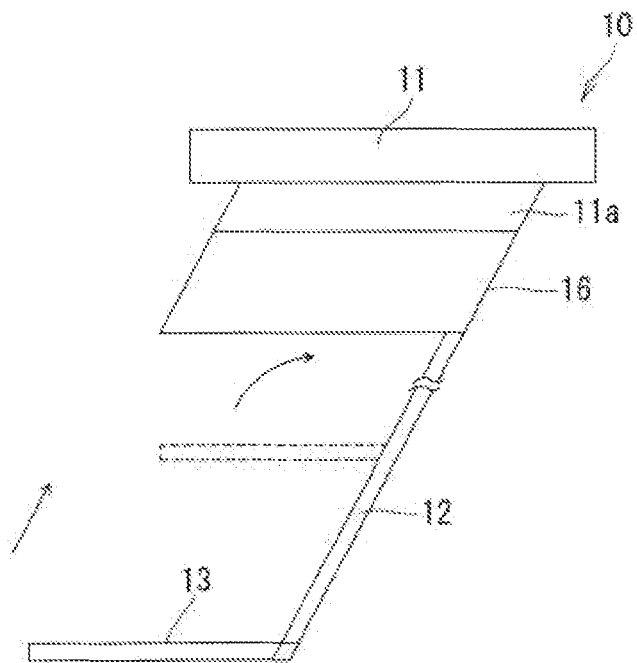
FIG. 4b is a front view of the door body according to the first embodiment of the disclosure.

As shown in FIGS. 4a and 4b, two pieces of the rest columns 12 are provided, each one end of which is fixed to the central convex portion 11a and extends downward along the inclination direction of the guide rail 20. Each other end of the rest columns 12 act as a free end. The rest columns 12 are reinforced by diagonal piece members 12a and side connecting members 14. The diagonal piece member 12a has one end fixed to the central convex portion 11a, and the other end fixed to an intermediate portion of the rest column 12. The side connecting members 14 are formed into a ladder-shaped configuration in which ends of the side connecting members 14 are fixed to the respective rest columns 12. Such is the structure that the rest columns 12 are reinforced by the diagonal piece members 12a and the side connecting members 14 to restrain the displacement of the rest columns 12 and increase an apparent rigidity of the rest column 12.

As shown in FIG. 3, the elevating stand 13 is formed substantially into a rectangular flat plate configuration. The elevating stand 13 has a pair of notches 13a, 13a which are provided in positions opposite to each other, and is slidably fixed to the rest column 12 to move along the rest column 12 while maintaining at a horizontal position. Further, the elevating stand 13 is adapted to rotate upward to a position in which an upper surface of the elevating stand 13 is in contact with the rest column 12. As shown in FIGS. 1a and 1b, when the door body 10 is fully ascended, the elevating stand 13 is located above the opening portion 31, and when the opening portion 31 is closed, the elevating stand 13 is located within the interior space 110.

Each of the two connecting portions 17 is fixed on the upper surface of the main body 11. The connecting portion 17 is provided to connect the main body 11 to the elevating device 50. One end portion of the connecting portion 17 is bifurcated to form a first end 17a and a second end 17b as bifurcated branches. The first end 17a is fixed to a chain 43 which serves as an endless belt, and the second end 17b is connected to the guide rail 20 through a pair of driven wheels 45, 45.

The elevating device 50 has a pair of guide rails 20, 20, motors 40, first gears 41, second gears 42, and chains 43. The guide rail 20 has a U-shaped cross section, an inner space of which forms a groove 20a. The guide rail 20 is fixed to the ceiling 30, and extends in a straight line upward while maintaining the predetermined angle against the ceiling 30.

Each of the motors 40 is mounted on an upper end surface of the guide rail 20 with the first gear 41 connected to a rotary shaft of the motor 40. The second gear 42 is rotatably fixed to a lower end of the guide rail 20. The chain 43 is stretched between the first gear 41 and the second gear 42. Upon energizing the motor 40, the first gear 41 is rotationally driven to move the endless chain 43 along the inclined direction of the guide rail 20 so as to rotationally drive the second gear 42. In the first embodiment, the first gear 41 is directly connected to the rotary shaft of the motor 40. Instead, the gear 41 is preferably connected to the rotary shaft via a transmission device. This makes it possible to decrease an amount of load to which the motor 40 is subjected, while ensuring a smooth ascending movement of the main body 11.

The driven wheels 45, 45 provided at the second ends 17b are placed to be in contact with opposed flanges 20b, 20b of the guide rail 20. The first end 17a is fixedly connected to the chain 43. Upon rotationally driving the first gear 41 by the motor 40, the rotational movement of the first gear 41 moves the chain 43 along the guide rail 20. In accompany with the movement of the chain 43, the main body 11 together with the connecting portion 17 ascends and descends along the inclined direction of the guide rail 20.

Described below is how to use the shelter door 1.

In normal times, heavy-weight materials such as, for example, an oxygen cylinder or the like can be readily brought in and out of the interior space 110. In concrete terms, after the door body 10 is fully ascended by means of a remote control operation, the elevating stand 13 is located above the opening portion 31 while being maintained in the horizontal position. After the interior space 110 is visually observed through the notches 13a to confirm safety, the oxygen cylinder is placed on the elevating stand 13, and the door body 10 is descended along the guide rail 20. When the door body 10 is fully descended, a worker who has been waiting in the interior space 110 in advance unloads the oxygen cylinder from the elevating stand 13. When the heavy-weight materials are brought out from the interior space 110, the same procedures as the above may be followed.

When the disaster occurs, the door body 10 is ascended fully by the remote control operation to open the opening portion 31. In this situation, the elevating stand 13 is slid upward with its upper surface rotated to be in contact with the rest column 12. Employing the side connecting member 14 as a handrail, an evacuee uses the ladder 60 to go down into the interior space 110. When the evacuation of all the evacuees is confirmed, the door body 10 is descended to close the opening portion 31. After closing the opening portion 31, the water W is stored in the ceiling 30. Even if the fire breaks out, the temperature rise within the interior space 110 is curbed by the latent heat effect of the water W. Further, even when the tsunami occurs, the ceiling side wall 32 protects the main body 11 against the tsunami.

With the main body 11 fitted to the opening portion 31 through the central convex portion 11b, the contact area between the main body 11 and the opening portion 31 increases. This makes it possible to provide the superior water-tightness than the slide door provides. Further, the increased contact area prevents the door body 10 from coming off the opening portion 31 due to an external force such as the wave power.

When the end of the disaster is confirmed, the water W stored within the ceiling 30 is drained outside. Then, the door body 10 is ascended to open the opening portion 31. The ladder 60 is used to get the evacuees outside through the released opening portion 31.

For those who have a difficulty in ascending and descending by themselves, especially for those people who are confined to wheelchairs in their daily lives by way of example, the elevating stand 13 is used as follows: Namely, it is preferable to move up and down the elevating stand 13 with those people sitting on the elevating stand 13 in order to evacuate those people into the interior space 110. This should be done in accordance with the various conditions based on the safety standards or the like. In concrete terms, when the door body 10 is fully ascended, the elevating stand 13 is slid to fix to a position in which an evacuee finds it easy to sit on. Then, the door body 10 is descended with the evacuee sitting on the elevating stand 13 with his or her feet set in the notches 13a. In this situation, it is to be noted that the wheelchair may be placed on the elevating stand 13 together. More preferably, the person should move to the elevating stand 13 while being confined to the wheelchair, and ascend and descend together with the wheelchair.

Embodiment 2

Figure 5B:
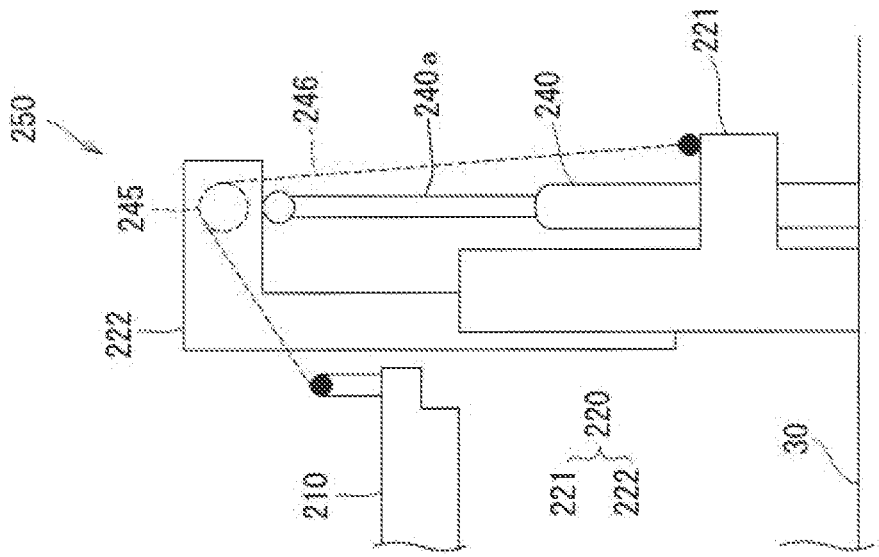
FIG. 5b is a partial front view of the elevating-type shelter door in a state where the opening portion is opened according to the second embodiment of the disclosure.
Figure 5A:
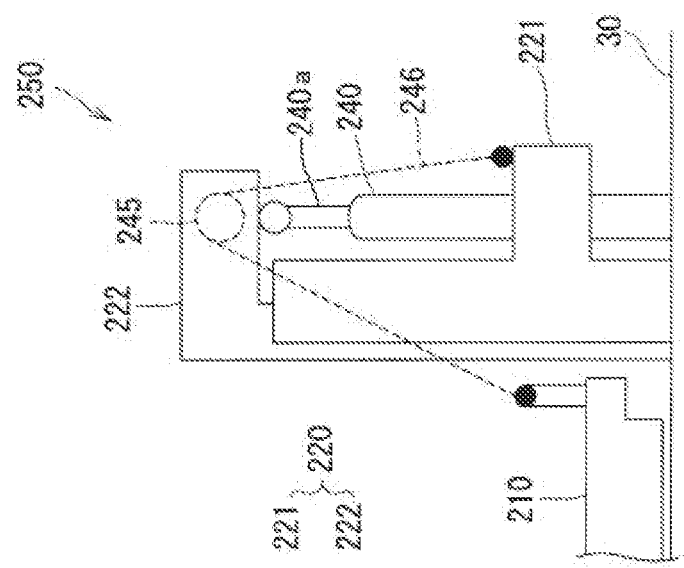
FIG. 5a is a partial front view of the elevating-type shelter door in a state where the opening portion is closed according to a second embodiment of the disclosure.

In reference to FIGS. 5a and 5b, a second embodiment of the disclosure is described below. Since the second embodiment of the disclosure has substantially the same structures as those of the first embodiment of the disclosure, described is the elevating device, which is mainly different from the first embodiment of the disclosure. The same reference numerals are given to the same structures as those in the first embodiment of the disclosure, and the series reference numerals more than 200 are employed to different structures.

An elevating device 250 has a pair of guide rails 220, pulleys 245, wires 246, and lift cylinders 240. The guide rail 220 has an outer guide rail 221 and an inner guide rail 222. The outer guide rail 221 is fixed to the ceiling 30 and extends vertically upward in a straight line.

The inner guide rail 222 has a structure to move up and down along the outer guide rail 221, and the pulley 245 is rotatably fixed to an upper end portion of the inner guide rail 222.

The lift cylinder 240 has one end fixed to the ceiling 30 and extends vertically upward and the other end connected to the inner guide rail 222 through a rod 240a.

A door body 210 is designed to be ascendible and descendible along the inner guide rail 222 by means of a driven wheel (not shown) or the like.

The wire 246 is fixed to the door body 210 at one end, and is fixed to the outer guide rail 221 by way of the pulley 245 at the other end.

When the lift cylinder 240 is moved upward, the inner guide rail 222 ascends along the outer guide rail 221 by a distance equivalent to an elevating distance of the lift cylinder 240. In this instance, the pulley 245 fixed to the inner guide rail 222 also ascends by the distance as the lift cylinder 240 ascends. The door body 210 is resultantly ascended and descended twice the distance as the lift cylinder 240 moves the rod 240a upward and downward. This makes it possible to increase the ascending and descending speed of the door body 210, while at the same time, structurally reducing a height of the guide rail 220 when the opening portion 31 is closed.

The structure needed to move the inner guide rail 222 upward and downward along the outer guide rail 221 and the structure needed to ascend and descend the door body 210 along the inner guide rail 222 are substantially the same as those used for a forklift. Since the above two structures are thought to be general, the description thereof is omitted.

The first and second embodiments of the disclosure are merely examples. The present disclosure is not limited to the above-described embodiments, but various modifications, substitutions, and the like can be made without departing from the technical idea of the present disclosure. By way of illustration, in the first and second embodiments of the disclosure, the inclination angle of the guide rail may be vertical or a predetermined inclination angle. Further, in the elevating device used in the first embodiment of the disclosure, the door body may be ascended and descended directly by means of a lift cylinder in lieu of the motor.

INDUSTRIAL APPLICABILITY

By adopting the elevating-type shelter door according to the present disclosure to an underground shelter, it is possible to bring the heavy-weight materials into and out of the interior space under the normal conditions. Additionally, the shelter door can address widely tsunami disasters, fires, and radioactive disasters. The industrial applicability is therefore significant.

REFERENCE NUMERALS

1: Shelter door
10: Door body
13: Elevating stand
20, 220: Guide rail
30: Ceiling
31: Opening portion
43: Chain (Endless belt)
50, 250: Elevating device
100: Shelter body
110: Interior space

What is claimed is:
1. An elevating-type shelter door, comprising:
a door body slidably fitted into an opening portion which is provided at a ceiling of a shelter body, and
an elevating device provided to ascend and descend the door body, wherein:
the elevating device comprises a guide rail provided to extend from the ceiling in a straight line, and the door body ascends and descends along the guide rail so as to open and close the opening portion,
the door body is restrained from descending, and closes the opening portion when the door body fits into the opening portion,
the door body fitted into the opening portion opens the opening portion by ascending,
the elevating device comprises an endless belt which is connected to the door body and driven to rotatably move along the guide rail, and
the door body ascends and descends along the guide rail by moving the endless belt.
2. The elevating-type shelter door according to claim 1, wherein the door body comprises an elevating stand provided at a lower end of the door body.
3. The elevating-type shelter door according to claim 2, wherein the elevating stand is located above the ceiling when the door body fully ascends, and the elevating stand is located within an interior space of the shelter body when the door body closes the opening portion.
4. The elevating-type shelter door according to claim 2, wherein the elevating stand is slidably mounted on the door body to move along a direction in which the door body ascends and descends.

5. The elevating-type shelter door according to claim 1, wherein the elevating device comprises a lift cylinder provided to expand and contract a rod along a direction in which the guide rail extends, and the door body ascends and descends along the guide rail by expanding and contracting the rod of the lift cylinder.

6. An elevating-type shelter door comprising:

a door body slidably fitted into an opening portion which is provided at a ceiling of a shelter body, and an elevating device provided to ascend and descend the door body, wherein:

the elevating device comprises a guide rail provided to extend from the ceiling in a straight line, and the door body ascends and descends along the guide rail so as to open and close the opening portion, the door body is restrained from descending, and closes the opening portion when the door body fits into the opening portion, the door body fitted into the opening portion opens the opening portion by ascending, the door body comprises an elevating stand provided at a lower end of the door body, and the elevating stand is slidably mounted on the door body to move along a direction in which the door body ascends and descends.

7. The elevating-type shelter door according to claim 6, wherein the elevating stand is located above the ceiling when the door body fully ascends, and the elevating stand is located within an interior space of the shelter body when the door body closes the opening portion.

8. The elevating-type shelter door according to claim 6, wherein the elevating device comprises a lift cylinder provided to expand and contract a rod along a direction in which the guide rail extends, and the door body ascends and descends along the guide rail by expanding and contracting the rod of the lift cylinder.

* * * * *